US012572498B2

(12) United States Patent
Kim et al.

(10) Patent No.: US 12,572,498 B2
(45) Date of Patent: Mar. 10, 2026

(54) SECURE SERIAL PERIPHERAL INTERFACE COMMUNICATION

(71) Applicant: Google LLC, Mountain View, CA (US)

(72) Inventors: Eunchan Kim, San Jose, CA (US); Timothy Jay Chen, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/553,056

(22) PCT Filed: Apr. 21, 2022

(86) PCT No.: PCT/US2022/071842
§ 371 (c)(1),
(2) Date: Sep. 28, 2023

(87) PCT Pub. No.: WO2022/226520
PCT Pub. Date: Oct. 27, 2022

(65) Prior Publication Data
US 2024/0184735 A1 Jun. 6, 2024

Related U.S. Application Data

(60) Provisional application No. 63/179,043, filed on Apr. 23, 2021.

(51) Int. Cl.
*G06F 13/42* (2006.01)
*G06F 21/85* (2013.01)

(52) U.S. Cl.
CPC .......... *G06F 13/4282* (2013.01); *G06F 21/85* (2013.01); *G06F 2213/0002* (2013.01)

(58) Field of Classification Search
CPC .................................................... G06N 20/00
See application file for complete search history.

(56) References Cited

U.S. PATENT DOCUMENTS 6,286,066 B1 9/2001 Hayes et al.
7,924,048 B2 4/2011 Oh et al.
(Continued)

FOREIGN PATENT DOCUMENTS

JP 2019121410 A 7/2019
JP 2019212293 A 12/2019
(Continued)

OTHER PUBLICATIONS

"Foreign Office Action", JP Application No. 2023-557156, Oct. 1, 2024, 12 pages.
(Continued)

*Primary Examiner* — Henry Tsai
*Assistant Examiner* — Juanito C Borromeo
(74) *Attorney, Agent, or Firm* — Colby Nipper PLLC

(57) ABSTRACT

This document discloses aspects of secure serial peripheral interface (SPI) communication. In some aspects, a secure SPI communication module monitors communications transmitted by a host to a peripheral block that is coupled to the host via a SPI interconnect. The module compares respective commands of the communications sent by the host to information indicating commands that the peripheral block is not authorized to execute. Based on the comparing, the module determines that one of the respective commands is one of the commands that the peripheral block is not authorized to execute. The module then prevents the peripheral block from receiving at least a portion of the respective command of the communication. By so doing, the module can prevent the peripheral block from executing unauthorized commands, which may compromise security of the peripheral block.

20 Claims, 9 Drawing Sheets

(56) References Cited

U.S. PATENT DOCUMENTS

| | | | |
|---|---|---|---|
| 8,123,133 | B2 | 2/2012 | Dubois et al. |
| 8,769,172 | B2* | 7/2014 | Soffer .................. G06F 13/105 |
| | | | 710/64 |
| 9,304,579 | B2 | 4/2016 | Ware et al. |
| 9,728,275 | B2 | 8/2017 | Tsuji et al. |
| 9,792,446 | B2 | 10/2017 | Chan et al. |
| 9,946,899 | B1 | 4/2018 | Wesson et al. |
| 9,953,166 | B2 | 4/2018 | Newell |
| 11,087,610 | B2 | 8/2021 | Anderholm et al. |
| 11,477,219 | B2 | 10/2022 | Jenkinson et al. |
| 12,153,720 | B2 | 11/2024 | Johnson et al. |
| 2003/0115503 | A1 | 6/2003 | Lehman et al. |
| 2009/0037747 | A1 | 2/2009 | Xie |
| 2009/0327429 | A1 | 12/2009 | Hughes et al. |
| 2014/0229644 | A1 | 8/2014 | Thanigasalam et al. |
| 2016/0180095 | A1 | 6/2016 | Sarangdhar |
| 2016/0378996 | A1 | 12/2016 | Smith et al. |
| 2017/0126472 | A1 | 5/2017 | Margalit et al. |
| 2017/0249099 | A1 | 8/2017 | Jun et al. |
| 2018/0034793 | A1 | 2/2018 | Kibalo et al. |
| 2019/0026478 | A1 | 1/2019 | Wu et al. |
| 2019/0088096 | A1 | 3/2019 | King et al. |
| 2019/0172047 | A1 | 6/2019 | Tan et al. |
| 2019/0180041 | A1 | 6/2019 | Bhunia et al. |
| 2019/0187922 | A1 | 6/2019 | Marley et al. |
| 2019/0327486 | A1 | 10/2019 | Liao et al. |
| 2020/0004994 | A1* | 1/2020 | Hershman ............... G06F 21/85 |
| 2020/0310662 | A1 | 10/2020 | Staab et al. |
| 2021/0124711 | A1 | 4/2021 | Ansari et al. |
| 2021/0312092 | A1 | 10/2021 | Belgarric et al. |
| 2022/0292226 | A1 | 9/2022 | Johnson et al. |
| 2022/0292228 | A1 | 9/2022 | Johnson et al. |
| 2024/0184735 | A1 | 6/2024 | Kim et al. |

FOREIGN PATENT DOCUMENTS

| | | | |
|---|---|---|---|
| JP | 2021507369 | A | 2/2021 |
| WO | 2021087417 | | 5/2021 |
| WO | 2021087418 | | 5/2021 |
| WO | 2022226520 | | 10/2022 |

OTHER PUBLICATIONS

"Notice of Allowance", U.S. Appl. No. 17/633,541, Aug. 28, 2024, 9 pages.

"Final Office Action", U.S. Appl. No. 17/633,530, Aug. 31, 2023, 15 pages.

"Foreign Office Action", CN Application No. 202080020058.6, Sep. 29, 2023, 25 pages.

"Intel Atom Processor C2000 Product Family for Microserver", Datasheet, Jan. 2016, 745 pages.

"International Preliminary Report on Patentability", Application No. PCT/US2020/058444, May 3, 2022, 7 pages.

"International Preliminary Report on Patentability", Application No. PCT/US2020/058445, May 3, 2022, 7 pages.

"International Preliminary Report on Patentability", Application No. PCT/US2022/071842, Oct. 24, 2023, 8 pages.

"International Search Report and Written Opinion", Application No. PCT/US2020/058445, Feb. 16, 2021, 10 pages.

"International Search Report and Written Opinion", Application No. PCT/US2020/058444, Feb. 16, 2021, 11 pages.

"Non-Final Office Action", U.S. Appl. No. 17/633,530, Mar. 2, 2023, 14 pages.

Sukhomlinov, et al., "Mitigating Malicious Firmware by Detecting the Removal of a Storage Device", Technical Disclosure Commons; Retrieved from https://www.tdcommons.org/dpubs_series/2378, Aug. 2, 2019, 10 pages.

"Enhanced Serial Peripheral Interface (eSPI)", Accessed online at: https://www.intel.com/content/dam/support/us/en/documents/software/ chipset-software/327432-004_espi_base_specification_rev1.0_cb. pdf on Mar. 30, 2021, 01/2061, 130 pages.

"International Search Report and Written Opinion", Application No. PCT/US2022/071842, Jul. 13, 2022, 12 pages.

"Non-Final Office Action", U.S. Appl. No. 17/633,541, Mar. 1, 2024, 22 pages.

"Foreign Office Action", IN Application No. 202347059884, Apr. 4, 2025, 6 pages.

* cited by examiner

100

200 —

400 —

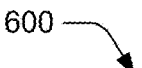

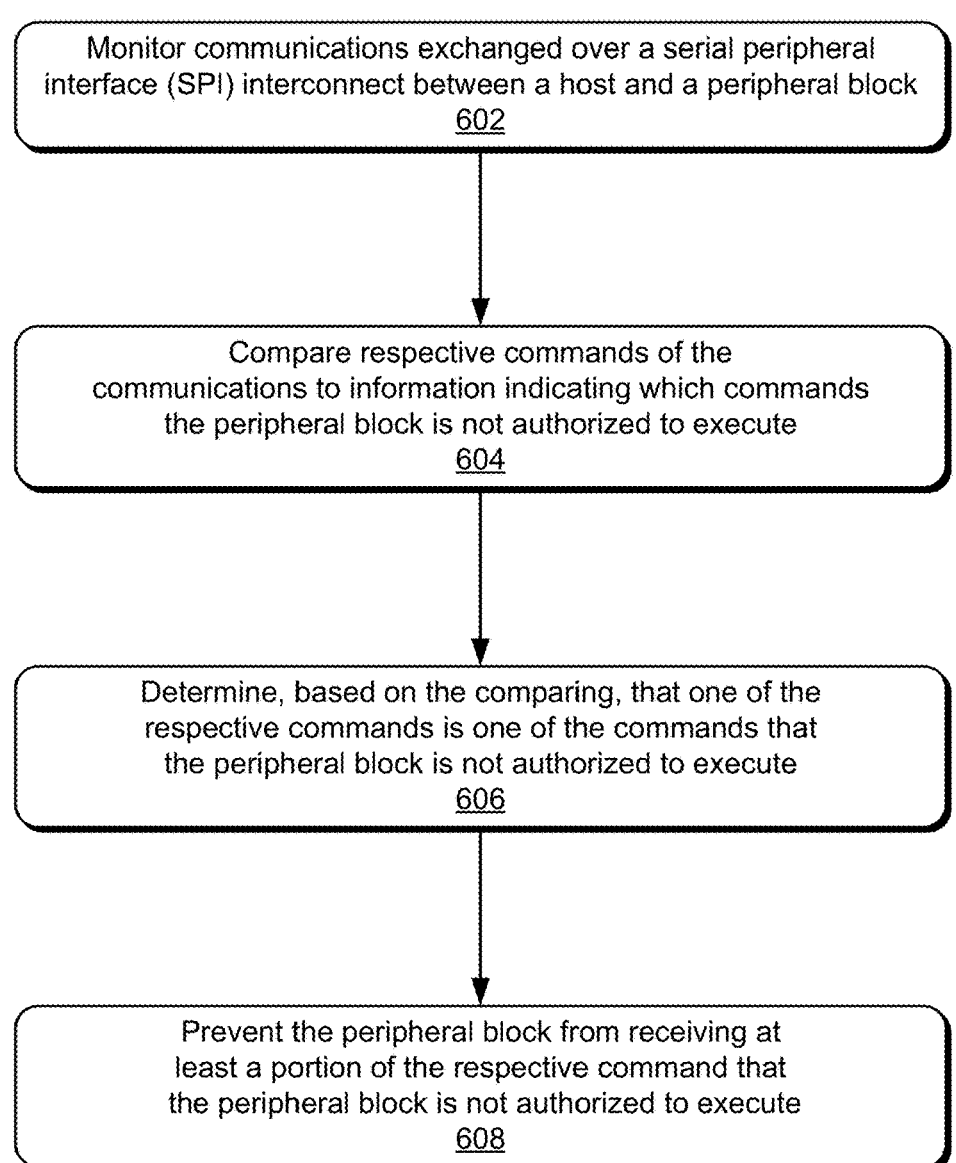

Monitor communications exchanged over a serial peripheral interface (SPI) interconnect between a host and a peripheral block
602

Compare respective commands of the communications to information indicating which commands the peripheral block is not authorized to execute
604

Determine, based on the comparing, that one of the respective commands is one of the commands that the peripheral block is not authorized to execute
606

Prevent the peripheral block from receiving at least a portion of the respective command that the peripheral block is not authorized to execute
608

*FIG. 6*

700 ⟍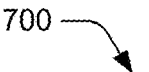

Monitor respective commands of communications
exchanged between a host and peripheral device
over a serial peripheral interface (SPI) interconnect
702

Compare the respective commands to a table of commands
that the peripheral device is not authorized to execute
704

Respective
command authorized for
execution?
706

Yes

No

Pass the communication
that includes the respective
command to the peripheral
device via the SPI interconnect
708

Gate a SPI clock line
to the peripheral device
710

Deassert a SPI chip select
line to the peripheral device
712

Resume the SPI clock line
when the host releases an
upstream chip select line
714

*FIG. 7*

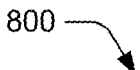

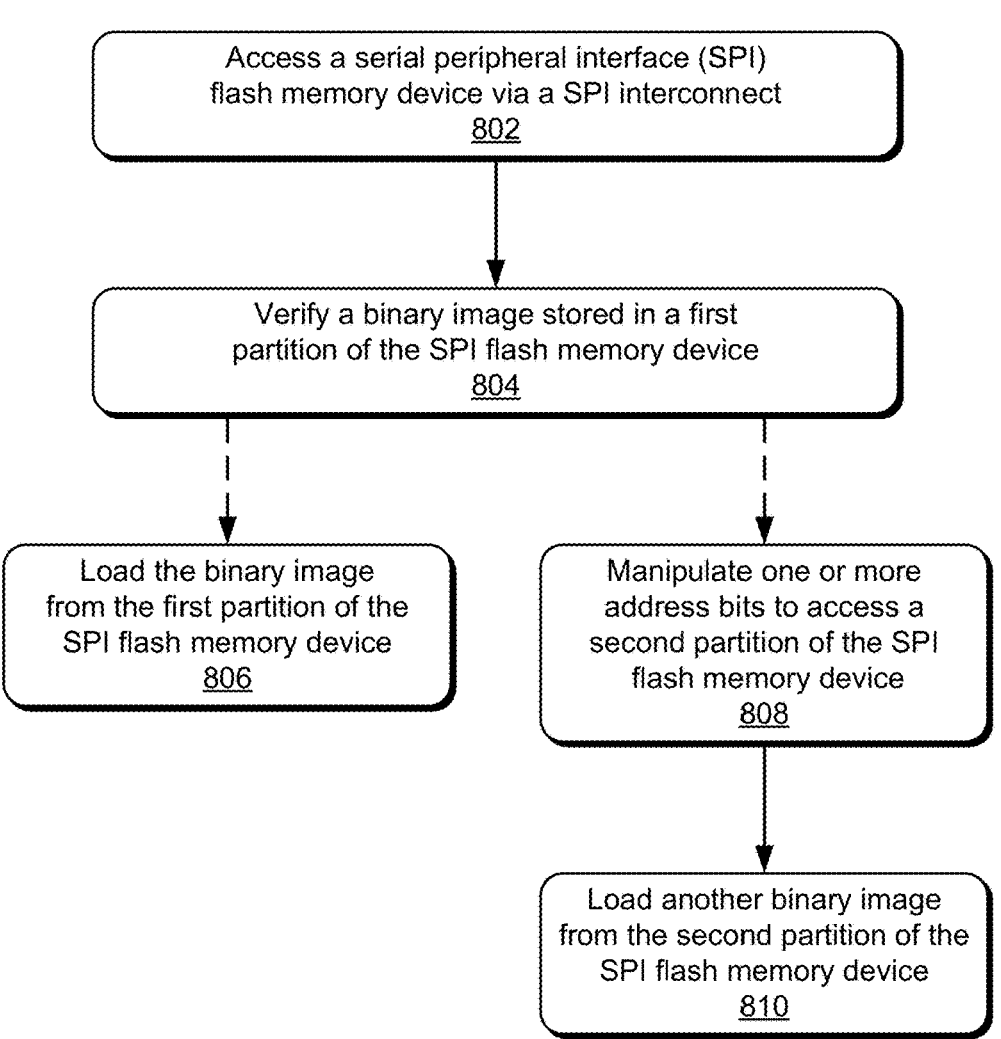

800

Access a serial peripheral interface (SPI)
flash memory device via a SPI interconnect
802

Verify a binary image stored in a first
partition of the SPI flash memory device
804

Load the binary image
from the first partition of the
SPI flash memory device
806

Manipulate one or more
address bits to access a
second partition of the SPI
flash memory device
808

Load another binary image
from the second partition of the
SPI flash memory device
810

*FIG. 8*

SECURE SERIAL PERIPHERAL INTERFACE COMMUNICATION

RELATED APPLICATIONS(S)

This application is a national stage entry of International Application No. PCT/US2022/071842, filed Apr. 21, 2022, which claims the benefit of U.S. Provisional Application No. 63/179,043, filed Apr. 23, 2021, the disclosures of which are incorporated herein by reference in their entirety.

BACKGROUND

As a result of the ever-increasing computerization of society, and the growing reliance upon personal computing devices to store sensitive user information and perform a variety of operations for its users, including operating vehicles, performing user authentication, and completing digital currency transactions, the world is increasingly susceptible to a variety of costly attacks on sensitive information of computing devices.

Recent fault-based cryptanalysis methods have identified potentially security-threatening methods involving fault injection attacks. A fault injection attack involves an attacker physically injecting, as opposed to a software injection, a fault into a computing system, thereby intentionally altering the behavior of an electronic component. As a result, fault injection attacks can circumvent many low-level system security features, alter a computing system behavior to accomplish malicious intents, and/or extract sensitive information. A fault injection attack may involve voltage glitching, clock glitching, laser injection, electromagnetic injection, and so forth. In some instances, these attacks can introduce fault injections in various locations to break or weaken electronic system security. Thus, fault injection attacks may alter a command or data being transferred within the computing system and can potentially alter execution flow of the system to cause downstream problems such as key leakage, privilege escalation, or unintentional execution of code.

SUMMARY

This document describes apparatuses and techniques for secure serial peripheral interface (SPI) communication. In some aspects, a secure SPI communication module monitors communications transmitted by a host or other bus controller to a peripheral block that is coupled to the host via a SPI interconnect. The secure SPI communication module compares respective commands of the communications sent by the host to information indicating commands that the peripheral block is not authorized to execute. Based on the comparing, the secure SPI communication module determines that one of the respective commands is one of the commands that the peripheral block is not authorized to execute. The secure SPI communication module then prevents the peripheral block from receiving at least a portion of the respective command of the communication. By so doing, the module can prevent the peripheral block from executing unauthorized commands, which may compromise security of the peripheral block by changing status registers, disabling protection schemes, accessing sensitive information, or the like.

This Summary is provided to introduce simplified concepts for implementing secure SPI communication, which is further described below in the Detailed Description and is illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of secure SPI communication are described throughout the disclosure with reference to the Drawings. The use of the same reference numbers in different instances in the description and the figures indicate same or similar elements:

FIG. 6 illustrates an example method for secure SPI communication in accordance with one or more aspects;

FIG. 7 illustrates an example method for filtering commands of SPI communications in accordance with one or more aspects;

FIG. 8 illustrates an example method for manipulating command addresses to enable alternate binary image access in accordance with one or more aspects.

DETAILED DESCRIPTION

Figure 1:
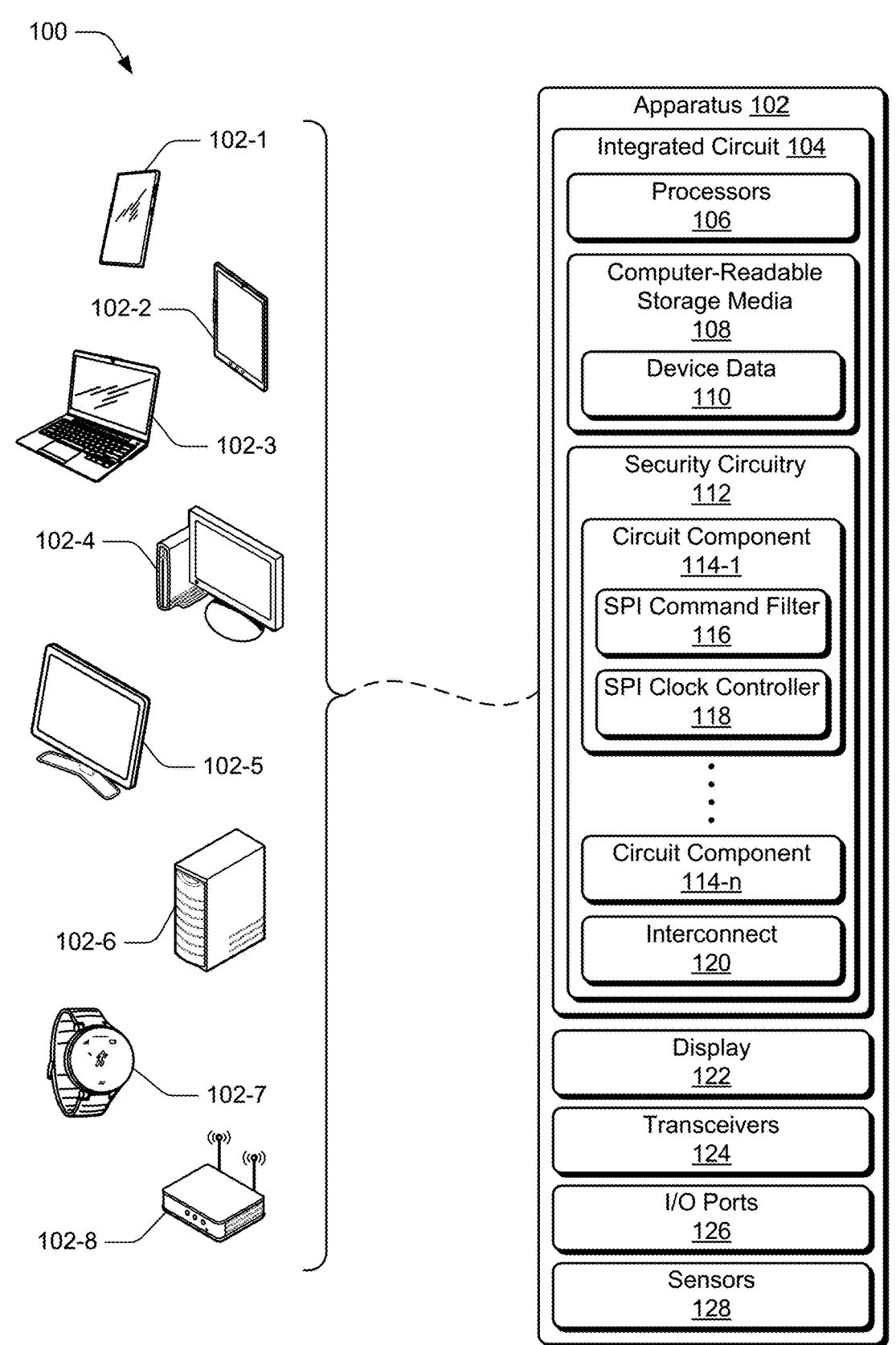
FIG. 1 illustrates an example operating environment that includes apparatuses that may implement aspects of secure SPI communication.

Computing systems often include an integrated circuit with security circuitry and software to provide a measure of protection against defects, attacks, and other potentially compromising events. In today's computing environment, bad actors can attack computing devices at a myriad of levels using a multitude of attack vectors. For example, fault injection attacks reduce the protection many of these security paradigms afford. Fault injection attacks can bypass system security features, alter a system behavior to accomplish malicious intents, and/or uncover confidential information. Using a fault injection attack, an attacker can indirectly or directly alter programmed operations of an electronic component (e.g., a central processing unit) using glitches (e.g., sudden, temporary, injected faults in a system). Such an attack can sometimes "brick" a computing device, but in other instances, precise and targeted attacks can introduce compromising security threats. For example, fault injection attacks can allow adversaries to undermine the control flow of a program, which may result in an incorrect function getting called, such as in "return to libc" type attacks. In some cases, these attacks may cause the computing device to expose sensitive data or execute unverified code. Thus, fault injection attacks may alter a command or data being transferred within the computing system and can potentially alter execution flow of the system to cause downstream problems such as key leakage, privilege escalation, or unintentional execution of code.

Preceding techniques aimed at addressing such attacks, however, are typically weak and ineffective at preventing attackers from altering commands and comprising system security. For example, in some preceding schemes, a device may change a last bit on an opcode as an attempt to cancel a command. This type of scheme, however, may be ineffective if the command is still consumed by a peripheral or not applicable if two commands are adjacent (e.g., off by one bit). Other previous schemes maintained a command table that mapped multiple commands into single command opcode. A table agent would traverse the command table while receiving each bit of the command and send out a different opcode to a downstream peripheral. Such mapping tables suffered from issues related to inefficient mapping certain commands into the table, which could not be filtered out or filtered in depending on system designer preference. Thus, the preceding techniques were vulnerable to various commands that could propagate through a system without restriction or filtering, resulting in system insecurities related to execution of unauthorized or unpermitted commands.

In contrast with preceding security techniques, this disclosure describes aspects of secure SPI communication. In aspects, a secure SPI communication module monitors communications transmitted by a host or other bus controller to a peripheral block that is coupled to the host via a SPI interconnect. The secure SPI communication module compares respective commands of the communications sent by the host to information indicating which commands the peripheral block is not authorized or not permitted to execute (e.g., an exclusion command list). Based on the comparing, the secure SPI communication module determines that one of the respective commands is one of the commands that the peripheral block is not authorized to execute. In response to the determination, the secure SPI communication module then alters a state of a chip select line and/or a clock line of the SPI interconnect to prevent the peripheral block from receiving at least a portion of the respective command of the communication. By so doing, the module can prevent the peripheral block from executing unauthorized commands, which may compromise security of the peripheral block by changing status registers, disabling protection schemes, accessing sensitive information, or the like.

Thus, in contrast with the preceding techniques, aspects of secure SPI communication described herein can protect SPI peripheral components by utilizing native operations, expected behavior, or protection mechanisms of the SPI peripheral component, such as a Flash memory device or chip. By way of review, Flash memory devices may typically protect status registers of the Flash memory device through use of a write protection pin or input (e.g., Write_Protect pin). Most of these Flash memory devices, however, when enabled for or used with quad read commands disable this dedicated write protection pin. As such, aspects of secure SPI communication as described herein provide Flash memory device protection through replicating write protection by implementing selective command filtering and/or selective data filtering.

Generally, a status register of a SPI Flash device or other peripheral includes specific protection bits that are configurable to protect or lock various sections of memory, such as for block protection, sector protection, top/bottom range protection, and so forth. In other words, setting one or more of these protection bits of the status register translate into protecting or preventing manipulation of predefined regions of memory in accordance with various protection schemes of the Flash memory device. Thus, a protection scheme or protection definition of the Flash memory device can only be changed by using specific commands through which access to the status register is enabled. Instead of filtering all commands, per previous techniques, aspects of secure SPI communication may protect a selective set of commands that are useful to access the status registers and change protection states (e.g., write-status-registers and similar) of the Flash memory device. Accordingly, if the described aspects of secure SPI communication prevent the host or another bus master from issuing these protected commands to change the protection state, the command issuer will not be able to change the protection state. By so doing, the host or other bus master cannot program or erase contents of the Flash memory device. In aspects, read commands would still be forwarded normally, and specific regions may be carved out to maintain an internal mailbox if desired.

With respect to the write-status-register, aspects of secure SPI communication may filter data of write-status-register commands to a downstream SPI Flash device instead of filtering the write-status-register commands into a value with no side-effects (e.g., such as read command). Thus, a secure SPI communication module may allow all command bytes to pass from the host to the SPI Flash device without manipulation. If the secure SPI communication module determines or identifies a command byte as a write-status-register command (a SPI Flash device or vendor can provide a programmable list useful to identify write status access), a programmed value of the command can be controlled by the secure SPI communication module.

In some aspects, a SPI device program value may be maintained through a select register and a value register. Generally, the select register controls whether a particular data bit is allowed to pass through from the host or forced from the secure SPI communication module or SPI device controller. The value register may control what the forced value is assuming the select bit is set. For example, assume the select register and value register are programmed as the Select Register set to "0011_0000 (0x30)" and the Value Register set to "xx01_xxxx." This means when a write-status command is detected, bits 4 and 5 (fourth- and fifth-bit positions) will be forced to "1" and "0", while the remaining bits of the command will be allowed to pass through. Because the write status commands may vary between chip vendors, what represents write-status can be programmable or configurable, although as few as two to four entries may be needed.

In addition to write-status commands, secure SPI communication may alter or protect other commands issued by a host or bus master that could affect a state of the protection bits of a peripheral device, which may include reset commands or other vendor specific commands. To do so, aspects of secure SPI communication may implement selective filtering that silences or alters a command before the command can be received, captured, or processed by a destination peripheral of a system. As described throughout this disclosure a secure SPI communication module or SPI command filter may deassert a chip select line or signal (CSb) of the peripheral device, such as a SPI Flash device, before a last bit of the command is fully captured. In aspects, the secure SPI communication module may detect, on an eighth clock cycle (e.g., prior to capture) that a command should be filtered. The secure SPI communication module then deasserts the chip select line early to ensure a last bit (e.g., eighth bit) command bit is not captured by the peripheral device. Alternatively or additionally, the secure SPI communication module can gate or hold a SPI clock line to the peripheral after a seventh beat or clock cycle to prevent the peripheral device from capturing the eighth bit of the command to be filtered. In some cases, these operations are timing sensitive, and the secure SPI communication module may act, such as to generating the control signal (e.g., gating and filter thereof), within one half of a SPI clock period. For example, with a 25 MHz to 100 MHz SPI clock, the secure SPI communication module may generate a control signal, toggle a chip select line, or gate the SPI clock within 10 to 50 nanoseconds to complete the described command filtering.

In aspects of secure SPI communication, a command filter may be configurable or programmable to implement selective command filtering in one or more ways to provide flexibility. In some cases, each command in a command space of 256 possible commands will have a 1-bit enable, such as through eight registers for the command space. The secure SPI communication module may use a received command, or portion of received command, to index into a table to determine whether the command is allowed to pass through or disallowed (e.g., filtered). For example, the enable bit control indicates or controls whether the command is allowed to pass downstream to the peripheral device or filtered. In some implementations, an enable bit value of one "1" indicates a command is allowed to pass and an enable bit value of zero "0" indicates that the command is filtered by the secure SPI communication module or command filter. Prior to filtering operations, software or firmware of the host may configure or program the filtering table.

With the secure SPI communication module implementing command filtering, status protection of the SPI Flash device may not be necessary as the secure SPI communication module can simply filter out or block commands that would enable manipulation of the status registers of the SPI Flash device. Thus, a benefit of having a selective or reduced-complexity command filtering and/or status register command data filtering is that fewer commands or instructions are filtered. In other words, a set of instructions that have to be filtered is reduced (e.g., commands that relate to write-status-registers), and for the remaining time, the secure SPI communication module allows the host of the system to communicate directly with the SPI Flash device. This results in the firmware or secure SPI communication module intervening less, in that firmware would not need to capture all command payloads and determine whether those payloads should pass downstream to the SPI Flash device. Alternatively or additionally, the host or system software may configure the secure SPI communication module to implement any combination of described aspects for command or data filtering. For example, the secure SPI communication module may be configured to implement command filtering only, default allow and/or disallow command filtering, disallow command filtering with status protection, allow command filtering with status protection, and so forth. These and other aspects described herein may ensure the protection settings of the SPI Flash device (e.g., SPI Flash chip) cannot be arbitrarily changed after the host or system software sets up or configures the secure SPI communication module to implement command filtering and/or A/B partition access. As such, as long as the downstream SPI Flash device acts according to its internal protection mechanisms, these aspects enable secure SPI communication to be implemented with less complexity and more efficiently than preceding techniques.

In various aspects, a secure SPI communication module is coupled to a SPI interconnect of a system that includes a host and a SPI Flash device, as well as any number of other system peripheral blocks or components. The secure SPI communication module may implement a command control scheme that includes snooping or monitoring SPI transactions from the host platform to the SPI Flash device and for intervening when unauthorized traffic is detected. The command control scheme is intended to block any harmful read/write requests or self-completed commands (e.g., chip erase). These self-completed commands may include commands that are not followed by other data, such as an address or a payload. In aspects, the scheme may use a SPI command filter and a SPI clock controller (e.g., clock-gating cell) as described herein. Generally, the command filter may block incoming commands based on a command block list or table, or the filter may only allow authorized commands to pass based on a permitted command list. The command block list or the permitted command list, depending on which one is used, may be implemented as software or in hardware circuitry. In aspects, to block a command, the command filter alters a chip select line or signal line before or at an eighth SPI clock edge during the command propagation.

Concurrently, the command filter may gate or hold a SPI clock line to the SPI Flash device until the host system releases its chip select signal. Note the SPI chip select line and SPI clock may be toggled concurrently, in close proximity (e.g., within a same clock beat or cycle), or in a partially overlapping fashion. In aspects, the secure SPI communication module includes a clock-gating cell to control propagation of the SPI clock. Thus, the clock-gating cell may not propagate the SPI clock signal, which originates at the host, to the SPI Flash device effective to prevent glitches on the chip select line or signal. In some cases, when the SPI clock signal is not gated, then the chip select line may need one more clock pulses to remove the glitch. In other words, without the clock signal gating, the command filter may miss the timing to raise the chip select signal in order to cancel the unauthorized command. Thus, with the SPI clock gating, the secure SPI communication module can deassert the chip select line or signal before the unauthorized command is fully transmitted to the SPI Flash device without glitching, and the SPI device may cancel the incomplete command without executing it.

These and other aspects of secure SPI communication described herein may ensure that memories cannot be attacked downstream of the security module or command filter, and that any read or writes into memory are bound or restricted to a specific address that an attacker cannot alter. The following discussion describes an operating environment, example systems and components, example implementations of secure SPI communication, example methods, and a System-on-Chip (SoC) in which components of the operating environment may be embodied. In the context of the present disclosure, reference is made to the operating environment by way of example only.

Example Environment

FIG. 1 illustrates an example environment 100 that includes an apparatus 102 in which aspects of secure SPI communication and associated communication integrity schemes can be implemented. The apparatus 102 may be implemented as any suitable device, some of which are illustrated as a smart-phone 102-1, a tablet computer 102-2, a laptop computer 102-3, a gaming console 102-4, a desktop computer 102-5, a server computer 102-6, a wearable computing device 102-7 (e.g., smart-watch), and a broadband router 102-8 (e.g., mobile hotspot). Although not shown, the apparatus 102 may also be implemented as any of a mobile station (e.g., fixed- or mobile-STA), a mobile communication device, a client device, a user equipment, a mobile phone, an entertainment device, a mobile gaming console, a personal media device, a media playback device, a health monitoring device, a drone, a camera, an Internet home appliance capable of wireless Internet access and browsing, an IoT device, and/or other types of electronic devices. The apparatus 102 may provide other functions or include components or interfaces omitted from FIG. 1 for the sake of clarity or visual brevity.

The apparatus 102 includes an integrated circuit 104 that utilizes one or more processors 106 and computer-readable media (CRM 108), which may include memory media or storage media. The processors 106 may be implemented as a general-purpose processor (e.g., of a multicore central-processing unit (CPU) or application processor (AP)), an application-specific integrated circuit (ASIC), graphics processing unit (GPU), or a system on chip (SoC) with other components of the apparatus 102 integrated therein. In aspects of secure SPI communication, one or more of the processors 106 may also include integrity functions as described throughout this disclosure.

The CRM 108 can include any suitable type of memory media or storage media, such as read-only memory (ROM), programmable ROM (PROM), random access memory (RAM), dynamic RAM (DRAM), static RAM (SRAM), or Flash memory (e.g., SPI Flash device or chip). In the context of this discussion, the computer-readable media 108 of the apparatus 102 is implemented as at least one hardware-based or physical storage device, which does not include transitory signals or carrier waves. Applications, firmware, and/or an operating system (not shown) of the apparatus 102 can be embodied on the computer-readable media 108 as processor-executable instructions, which may be executed by the processor 106 to provide various functionalities described herein. The computer-readable media 108 may also store device data 110, such as user data or user media that is accessible through the applications, firmware, or operating system of the apparatus 102.

In this example, the integrated circuit 104 contains security circuitry 112. The apparatus 102, the integrated circuit 104, or the security circuitry 112 may implement a secure cryptographic processor. The security circuitry 112 may be implemented using one or more circuit components 114, for example, circuit component 114-1 through circuit component 114-n. The circuit components 114 may be organized to perform any number of operations to enable functionality of the apparatus 102. Examples of circuit components include a processor and multiple functional components, peripherals, and/or IP blocks as described in FIG. 2. The security circuitry 112 can be realized as, for example, a protected enclave, a trusted chip platform, a hardware-based root of trust (RoT) chip (e.g., a silicon RoT), and so forth. Regardless of how or where the security circuitry 112 is incorporated into an electronic device, the security circuitry 112 may counter or deter many different types of attacks, such as attacks or malicious commands issued across a SPI bus or interconnect as described with respect to secure SPI communication.

In aspects, the security circuitry 112 includes circuit components 114-1 through 114-n that provide or implement respective functions of the security circuitry 112, ROT circuitry, the integrated circuit 104, and/or the apparatus 102. To implement aspects of secure SPI communication, a circuitry component 114 includes a SPI command filter 116 and a SPI clock controller 118, which may be implemented as part of a secure SPI communication module. In aspects, the SPI command filter 116 monitors communications exchanged by a host of the apparatus 102 and a Flash memory module (e.g., CRM 108) of the apparatus 102. Generally, the SPI command filter 116 compares respective commands of the communications sent by the host to information indicating which commands the Flash memory module is not authorized to execute. Based on the comparing, the SPI command filter 116 determines that one of the respective commands is one of the commands that the Flash memory module is not authorized to execute (e.g., a write-status-register command). In response to the determination, the SPI command filter 116 can deassert a chip select line of the Flash memory module or use the SPI clock controller 118 to gate or suspend a SPI clock line of the Flash memory module. By so doing, the SPI command filter 116 can prevent the Flash memory module from receiving or processing at least a portion of the unauthorized command, which may prevent the unauthorized command from comprising security of the Flash memory module. Alternatively or additionally, the SPI command filter 116 or a secure SPI communication module may verify integrity of a binary image stored on a first partition of the Flash memory module. If integrity verification fails, the SPI command filter 116 may alter an address of a SPI interconnect transaction to cause another binary image to load from a second partition of the Flash memory module to prevent the host from loading the unverified, and possibly compromised, binary image from the first partition. These are but a few examples of entities useful to enable secure SPI communication, the implementations and uses of which vary and are described throughout the disclosure.

As shown, the security circuitry 112 is coupled to an interconnect 120, which may couple components, peripherals, and/or destinations of the security circuitry with a host or host interface. The interconnect 120 can be realized using, for example, a bus, a switching fabric, a link, communication channels, or a bus network that enables the various circuit components to communicate. In some aspects, the interconnect includes a SPI interconnect or bus that is implemented in accordance with a serial peripheral interface communication standard. In some implementations, the SPI interconnect includes a chip select line, a clock line, and four I/O lines (e.g., S[3:0] or D[3:0]). Each of the circuit elements may be directly or indirectly coupled to the interconnect 120. The interconnect 120 may enable communication with data ports or interfaces of the apparatus 102 to enable circuit components to communicate with other devices or data networks.

The apparatus 102 may also include a display 122, transceivers 124, input/output ports (I/O ports 126) and/or sensors 128. The display 122 may be operably coupled with one of the processors 106 (e.g., graphics processing unit (GPU)) and configured to graphically present respective interfaces of an operating system or applications of the apparatus 102. The transceivers 124 may be configured to enable wired or wireless communication of data (e.g., device data 110) over wired or wireless networks according to any suitable communication protocol. The I/O ports 126 of the apparatus 102 may include universal serial bus (USB) ports, coaxial cable ports, and other serial or parallel connectors (including internal connectors) useful to couple the electronic device to various components, peripherals, or accessories such as keyboards, microphones, or cameras.

The apparatus 102 also includes sensors 128, which enable the apparatus 102 to sense various properties, variances, stimuli, or characteristics of an environment in which the apparatus 102 operates. For example, the sensors 128 may include various motion sensors, ambient light sensors, acoustic sensors, capacitive sensors, infrared sensors, temperature sensors, radar sensors, or magnetic sensors. Alternatively or additionally, the sensors 128 may enable interaction with, or receive input from, a user of apparatus 102, such as through touch sensing, gesture sensing, or proximity sensing.

Example Circuit Components

Figure 2:
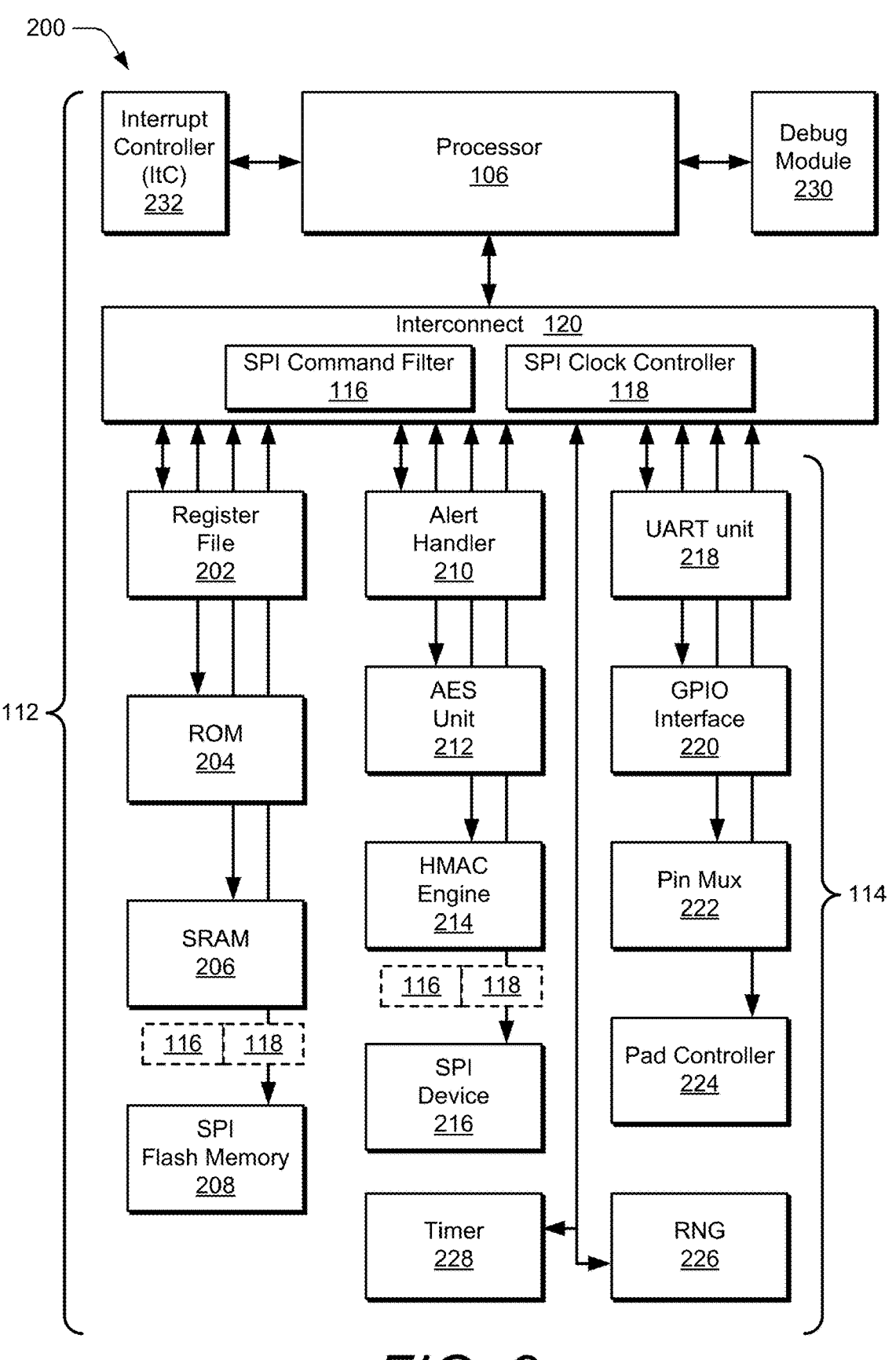
FIG. 2 illustrates an example system that includes a processor and multiple circuit components that can implement aspects of secure SPI communication.

FIG. 2 illustrates at 200 example security circuitry 112 that includes a processor and multiple circuit components which can be implemented to support aspects of secure SPI communication. As shown, the security circuitry 112 includes a processor 106 that is coupled to an interconnect 120. Each of the processor 106, the multiple memories, and the multiple other circuit components 114 may be directly or indirectly coupled to the interconnect 120. In aspects, the components of FIG. 2 may be embodied as a secure computing platform or a secure System-on-Chip that implements a root-of-trust and/or other secure cryptographic features. Alternatively or additionally, the components of FIG. 2 may be implemented as one or more ICs, peripheral blocks, or IP blocks of a system that are coupled by the interconnect 120, which may be implemented as a fabric that operably couples the components or IP blocks of the system.

In aspects, the interconnect 120 may include or be coupled with a SPI command filter 116 and a SPI clock controller 118, which may be implemented as part of a secure SPI communication module. In aspects, the SPI command filter 116 monitors communications exchanged by a host of a system and a SPI memory device of the system. Generally, the SPI command filter 116 compares respective commands of the communications sent by the host to information indicating which commands the Flash memory module is not authorized to execute. Based on the comparing, the SPI command filter 116 determines that one of the respective commands is one of the commands that the Flash memory module is not authorized to execute (e.g., a write-status-register command). In response to the determination, the SPI command filter 116 can deassert a chip select line of the Flash memory module or use the SPI clock controller 118 to gate or suspend a SPI clock line of the Flash memory module. These are but a few examples of the SPI command filter 116 and SPI clock controller 118, the implementations and uses of which vary and are described with reference to FIGS. 3-5 and throughout the disclosure.

The processor 106 may be coupled with the circuit components 114 through the interconnect 120 and/or directly coupled with other components or interfaces. As shown in FIG. 2, a system may include multiple circuit components 114 coupled to the interconnect 120 enabling interaction with the processor 106, which may function as a host of the system. In this example, the circuit components 114 include a register file 202 and various memories 204 through 210. The circuit components 114 may include one or more memories of any suitable configuration (e.g., CRM 108) and include a ROM 204, an SRAM 206, and a SPI Flash memory 208. In this example, a SPI command filter 116 and/or SPI clock controller 118 may be implemented between the interconnect 120 and the SPI Flash memory 208.

In aspects, the SPI Flash memory 208 includes control status registers (CSRs) and Flash media configured to store information of the system or host. A status register of the SPI Flash device or other memory peripheral may include specific protection bits that are configurable to protect or lock various sections of memory, such as for block protection, sector protection, top/bottom range protection, and so forth. In aspects, the SPI command filter 116 and SPI clock controller 118 may prevent unauthorized commands from being consumed by the SPI Flash memory 208 and altering settings of the CRSs of the SPI Flash memory 208. In some cases, the SPI Flash memory 208 does not include a write protect input node or a write protect input node of the peripheral block is disabled, such as when quad mode access is enabled. Although not shown, circuit components 114 may include other memories (e.g., one-time programmable or DRAM memories) and/or memories coupled via other components, such as additional serial peripheral interface- (SPI-) or USB-coupled memories.

As shown in FIG. 2, the circuit components 114 may also include an alert handler 210, an advanced encryption standard (AES) unit (AES unit 212), a hash-based message authentication code (HMAC) engine (HMAC engine 214), and a serial peripheral interface (SPI) device (SPI device 216). Here, note that a SPI command filter 116 and/or SPI clock controller 118 may be implemented between the interconnect 120 and the SPI device 216, which may prevent the SPI device 216 from consuming unauthorized commands as described herein. The circuit components 114 can also include a universal asynchronous receiver/transmitter (UART) unit (UART unit 218), a general-purpose input/output (GPIO) interface (GPIO interface 220), a pin multiplexer (pin mux 222), and a pad controller 224. The multiple circuit components 114 can further include a random number generator (RNG 226), from which the other components may obtain high entropy values to use as authentication tokens, and a timer 228 (e.g., watchdog timer). Although certain examples of memories and other components 114 are depicted in FIG. 2 or described herein, a given implementation of the security circuitry 112 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 112 may include at least one clock generator to generate the clock signals or may include reset circuitry to reset one or more individual components independently of each other, multiple components jointly, or an entire IC chip. Alternatively, the security circuitry 112 may receive at least one clock signal or a reset signal from a source that is external to the security circuitry 112, which source may or may not be on a separate chip. One or more separate components 114 may operate in respective individual clock domains. For instance, circuit components may be synchronized to a clock that is local to a respective component. Components in different clock domains may operate or communicate asynchronously with respect to one another.

Example implementations of the illustrated components are described below. The processor 106 may be realized as a "main," "central," or "core" processor for the security circuitry 112 through which functionalities of a host or bus controller are implemented. The processor 106 may, by way of example only, be implemented with a 32 bit, in-order reduced instruction set computing (RISC) core with a multi-stage pipeline. With, e.g., a RISC-V functionality, the processor may implement an M (machine) and a U (user) mode. Activating a reset pin (not shown) (e.g., through de-assertion of an active-low reset pin) causes the processor 106 to exit reset and begin executing code at its reset vector. The reset vector may begin in the ROM 204, which validates code in an embedded Flash or any Flash memory of the system before jumping to it. In other words, the code is expected to have been instantiated into the e Flash before the reset is released. In some cases, resets throughout the security circuitry 112 can be made asynchronous active-low as per a comportability specification to support interoperability among the various circuit components. A reset may be generated by the alert handler 210 as a security countermeasure; by a watchdog timer; and so forth. Reset signals may also be sent to other circuit components, such as one of the memories or one of the other components 114.

Coupled to the processor 106 are a debug module 230 (DM) and an interrupt controller 232 (ItC), either of which may also be made comportable. The debug module 230 provides debug-access to the processor 106. By interfacing with certain pins of the IC, logic in the debug module 230 allows the processor 106 to enter a debug mode and provides an ability to inject code into the device (e.g., by emulating an instruction) or into a memory. The interrupt controller 232 may be disposed proximate to the processor 106. The interrupt controller 232 can accept a vector of interrupt sources from within the security circuitry 112. The interrupt controller 232 can also assign leveling and priority to the interrupts before forwarding them to the processor 106 for handling.

The processor 106 can provide any desired level of performance or include any internal circuit components. For example, the processor 106 can include at least one arithmetic logic unit (ALU) (e.g., including an "additional" ALU to calculate branch targets to remove a cycle of latency on taken conditional branches), a register file, a control unit, and input/output (I/O) units, and multiple pipeline stages. With multiple pipeline stages, a pipeline can perform register writeback to reduce a cycle of latency from loads and stores and prevent a pipeline stall where a response to a load or store is available the cycle after the request. The processor 106 can implement a single-cycle multiplier or produce an imprecise exception on an error response to a store, which allows the processor to continue executing past the store without waiting for the response. Although not depicted, the processor 106 specifically, or the security circuitry 112 generally, can include an instruction cache to provide single-cycle access times for instructions.

The ALU may be configured to perform arithmetic and logical operations on received data. The register file (e.g., register file 202), which is described further in reference to FIGS. 3A and 3B, may be an array of processor registers (e.g., control registers), serving as high-speed, semi-transient memory configured for quick data access during program or function processing. The register file may be tightly coupled to the ALU of the processor 106. To further facilitate access to the data, the register file may include multiple read ports or multiple write ports to enable the ALU and/or execution unit to contemporaneously retrieve multiple operands in a single cycle. The register file may be formed from flip-flops to accelerate reading and writing bits of the data. The control unit may be configured to control the flow of data throughout the system(s). The I/O units may include ports operably interfaced with other components of the device or security circuitry 112. Further aspects of the processor 106, circuit components 114, SPI command filter 116, SPI clock controller 118, or a secure SPI communication module are described with reference to FIGS. 3-9 and throughout the disclosure.

Figure 3:
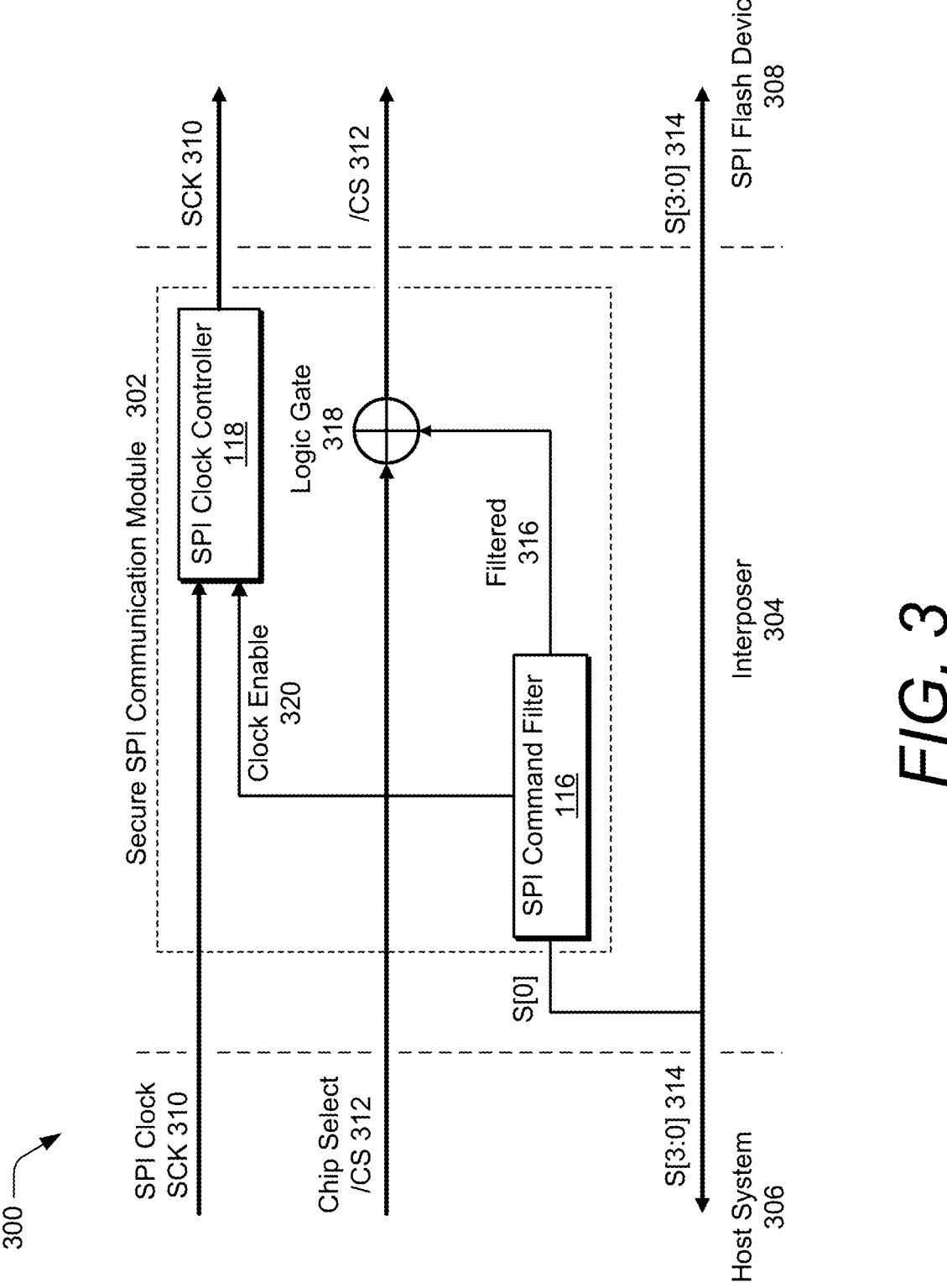
FIG. 3 illustrates an example configuration of system components that implement SPI command filtering in accordance with one or more aspects.

FIG. 3 illustrates at 300 an example configuration of system components that implement SPI command filtering in accordance with one or more aspects. The example interposer and/or other components of FIG. 3 may be implemented in association with any other component, architecture, entity, or system described throughout this disclosure. Generally, a secure SPI communication module 302 (e.g., SPI filter of a RoT circuit) is implemented on an interposer 304 or operably associated with a SPI-based interconnect between a host system 306 and a downstream peripheral, such as SPI Flash device 308. In this example, the secure SPI communication module 302 includes an instance of the SPI command filter 116 (or a SPI command detector) and the SPI clock controller 118, which may be implemented or include a clock-gating cell (not shown).

In aspects, a SPI interface between the host system 306 and the SPI Flash device 308 includes a SPI clock line 310 (SCK 310), a SPI chip select line 312 (/CS 312), and serial data lines 314 (S[3:0] 314), though other interconnect or fabric configurations may be implemented in accordance with aspects of secure SPI communication. In some cases, the interposer 304 may be implemented as a portion of a silicon RoT circuit or other security circuitry configured to monitor commands of communications exchanged between the host system 306 and the SPI Flash device 308. As shown in FIG. 3, the secure SPI communication module 302 or interposer 304 may include the SPI command filter 116 and the SPI clock controller 118. In aspects, the SPI command filter has access to the serial data lines 314 to monitor command and opcodes traversing the SPI interface to the SPI Flash device 308. The SPI command filter 116 may include an output to provide a command filtered signal 316 (filtered 316) to a logic gate 318 or logic circuitry coupled to the chip select line 312. In some cases, the logic gate 318 includes an exclusive OR gate, an OR gate, an AND gate, a multiplexor, a combination of logic gates, or any other suitable logic. Generally, by altering a state of the command filtered signal line, the SPI command filter can alter a state (e.g., deassert) of the chip select line 312 to prevent the SPI flash device 308 from receiving, consuming, or processing a command or opcode communicated over the data lines 312 of the SPI interface. Alternatively or additionally, the SPI command filter 116 may include an output to provide a clock enable signal 320 to the SPI clock controller 118. When an unauthorized command is detected, the SPI command filter 116 can alter a state of the clock enable line 320 to cause the SPI clock controller 118 to gate the SPI clock 310 that propagates to the SPI Flash device 308.

In the context of FIG. 3, the SPI command filter 116 may monitor or snoop communications exchanged between the host system 306 and the SPI Flash device 308. The SPI command filter 116 can compare respective commands or opcodes of the communications sent by the host system to information indicating which commands the SPI Flash device is authorized or not authorized to execute (e.g., an inclusion or exclusion table of commands). If the command of the communication is authorized, the SPI command filter 116 lets the command or opcode pass downstream to the SPI Flash device 306. Alternatively, the SPI command filter 116 may determine that the command or opcode is not authorized for execution by the SPI Flash device 308, such as at an eighth bit of opcode or command. In response to the determination, the SPI command filter 116 uses the logic gate 318 to deassert the chip select line 312 and uses the SPI clock controller 118 to gate the SPI clock signal 310 to the SPI Flash device. Generally, if clock select line 312 to the downstream SPI Flash device is deasserted before an eighth bit or beat of the command or opcode, the SPI Flash device 308 will discard the command or a portion thereof. In some cases, if the SPI command filter 116 toggles only the chip select line 312, the chip select line may be prone to glitches, such as due to the combination logic from the eighth bit of opcode. Generally, control of the chip select line 312 should be a registered output to be free of glitches as it may be too late when the eighth opcode has already received by the SPI Flash device 308. To address this glitch issue, the SPI command filter 116 may gate the SPI clock 310 to control or toggle the chip select line 312 without introducing glitches, which may ensure the SPI Flash device 308 is prevented from receiving or consuming the eighth bit of the opcode or command.

Figure 4:
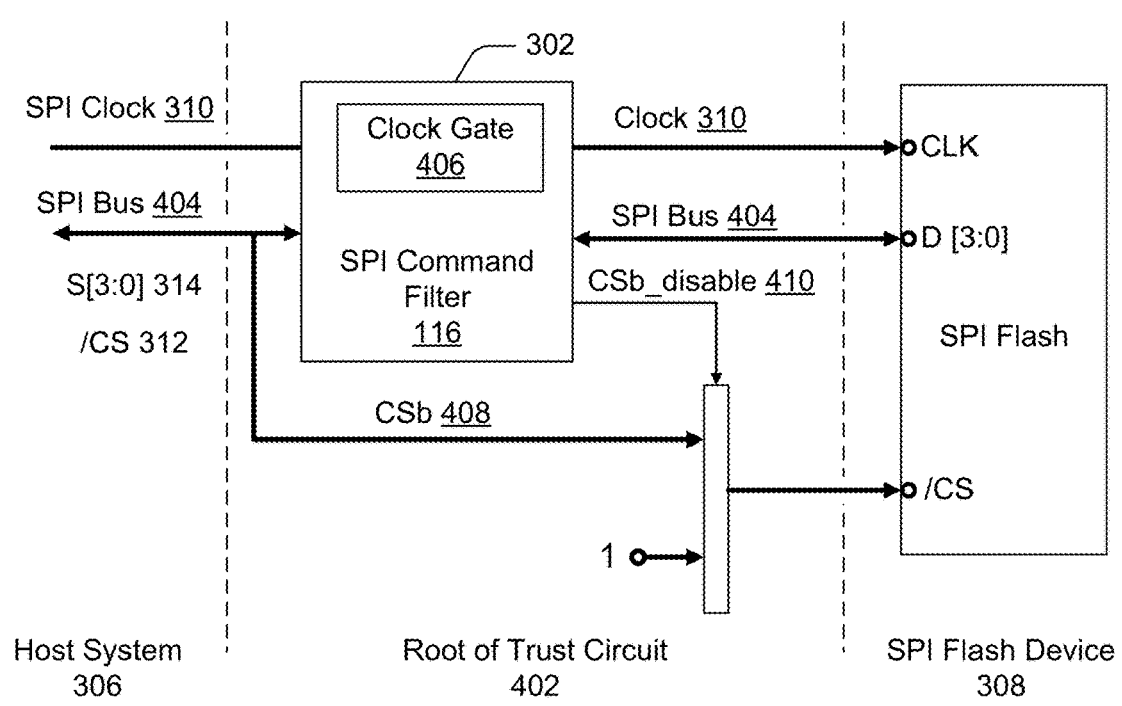
FIG. 4 illustrates an example system that includes clock gating and command filtering functions for implementing aspects of secure SPI communication.

FIG. 4 illustrates at 400 an example system that includes clock gating and command filtering functions for implementing aspects of secure SPI communication. The example root of trust circuit and/or other components of FIG. 3 may be implemented in association with any other component, architecture, entity, or system described throughout this disclosure. The example system 400 includes a root of trust circuit 402 that is coupled between or with a host system 306 and a SPI Flash device 308. Generally, the SPI command filter 116 and/or secure SPI communication module 302 may implement aspects of secure SPI interfaces as described herein. The SPI command filter 116 may be implemented as a secure serial peripheral interface (SPI) device passthrough module (e.g., the secure SPI communication module 302). By way of example, this secure SPI device passthrough module may include a feature for snooping the SPI transactions from a host system to a SPI Flash device and for intervening for the unauthorized traffic. This module may be implemented for blocking any harmful read/write requests and/or for guaranteeing the return of genuine binary images to the host system.

In this example system, the root of trust circuit 402 is operably coupled with a SPI bus 404 that includes a SPI clock 310, SPI chip select line 312, and serial data lines 314, which may be implemented similar to or different from those described with reference to FIG. 3. A clock gate cell 406 (clock gate 406) receives the SPI clock 310 from a system host or clock circuit and provides the SPI clock 310 to the SPI Flash device 308. In aspects, the SPI command filter 116 monitors the SPI bus 404, which includes a chip select bit 408 for the SPI Flash device 308. As shown in FIG. 4, the SPI command filter 116 may selectively generate a chip select bit disable signal 410 (CSb_disable 410) to gating logic that gates application or propagation of the chip select bit 408 to the SPI Flash device 308.

In aspects of secure SPI communication, at least some bits of a SPI command or opcode (e.g., seven of eight bits) may be clocked to the SPI Flash device 308 based on the SPI clock 310. In some cases, the SPI command filter 116 may be unable determine whether the command is authorized or unauthorized until the SPI command filter 116 receives all eight bits of the command. The SPI command filter 116 may determine the eighth bit of the command in an early part of the SPI clock 310 clock pulse corresponding to that eighth bit, and then determine whether the command is authorized or not. For example, the SPI command filter may compare the complete command or opcode to a table of information that indicates which commands are authorized for execution by the SPI Flash device 308. In response to determining that the command is not authorized, the SPI command filter 116 de-asserts a clock enable signal of the clock gate 406, to pause or delay the SPI clock signal 310 to the SPI Flash device 308, to prevent the eighth bit of the command from being registered or consumed by the SPI Flash device 308. Alternatively or additionally, in response to determining that the command is not authorized, the SPI command filter 116 can assert the chip select bit disable signal 410 to the gating logic, thereby causing the gating logic to deassert the SPI chip select signal 312 to the SPI Flash device 308 to prevent the device from consuming one or more bits of the unauthorized command. By so doing, the SPI command filter 116 can prevent the unauthorized command from reaching or registering within the SPI Flash device, thus preventing an execution of an unauthorized SPI opcode.

Generally, the SPI command filter 116 or secure SPI communication module 302 can block any downstream commands if they are not permitted and/or swap the address field for read commands to support A/B partition or binary image scheme. As described herein, the SPI command filter 116 may be configured to block incoming commands if they are in the block list (e.g., for CSR commands) that software or hardware of the system has configured. When the SPI command filter 116 blocks a command, the filter may alter or toggle the chip select line or chip select bit at an edge of an eighth beat or cycle of the SPI clock 310 and gate or hold the SPI clock 310 to low until the host system releases its chip select line (e.g., upstream from the SPI command filter 116). In aspects, the SPI command filter 116 uses the clock gate cell 406 to not propagate the SPI clock 310 to the attached SPI Flash device 308, which may reduce or prevent glitching on the chip select line and ensure orderly operation of the SPI Flash device. When the SPI command filter 116 does not gate the SPI clock line 310, the chip select line 312 may need one or more clock cycles to resolve any glitch. In some cases, this timing delay may cause the SPI command filter 116 to miss the correct timing to raise or alter the chip select line in order to cancel the self-complete commands, such as chip erase commands. Thus, the SPI command filter 116 may deassert the SPI chip select line and gate the SPI clock line to prevent glitching of the SPI chip select line and ensure timing of the chip select line toggle is effective to prevent self-complete command from being consumed by the SPI Flash device. Further, to enable deassertion of the SPI chip select line to work, a few assumptions regarding SPI communication may be made in the context of the SPI command filter controlling the chip select line. These assumptions may include that deasserting SPI chip select line in the middle of a transmit operation does not degrade the quality of I/O of the Flash device and that if the chip select line is deasserted prior to the eighth SPI clock cycle or beat, the SPI Flash device 308 cancels the command or process without making any assumptions about the intended behavior of the command. For example, the SPI Flash device 308 may not charge a charge-pump in the seventh SPI clock cycle or beat to prepare the SPI Flash device chip for erasure. Although described in the context of host-to-SPI device access, the aspects described herein may also be applied to SPI device-to-host access to prevent unauthorized payloads or data issued by the SPI Flash from reaching the host device.

The secure SPI communication module 302 may also implement address manipulation in which software can configure this module to swap the SPI data line 0 to the downstream device for the first 32 beats of data after the SPI command. This may be supported, by way of example, for commands that are Read commands, except for Dual IO and Quad IO commands. Generally, a SPI device can provide two programmable CSRs to support this address manipulation feature. In aspects, these registers include a mask register and a data register that holds or stores data for sending to the downstream device. The mask register may be set by the host or secure SPI communication module 302 to indicate one or more of the address bits to be swapped. If the mask bit corresponding to the address bit position is 1, then the value transferred to the downstream device can be the value from the data register rather than the value from the host system. In aspects, one or both registers are implemented as 32-bit registers. If a 4B address mode of the SPI Flash device is not enabled, a lower 24-bit from the registers may be used for the address manipulation. The usage of these address manipulation features may vary, with one purpose being to provide host access to an A/B binary image. In aspects, the root of trust circuit 402 or other ROT circuit of the system may verify the binary image stored by the SPI Flash device 308. If this binary image has been manipulated by malicious attacks or reliability issues, then logic in the RoT circuitry can set the registers to redirect the request of the host system to the other partition of the SPI Flash device (e.g., other half or split partition of Flash).

Figure 5:
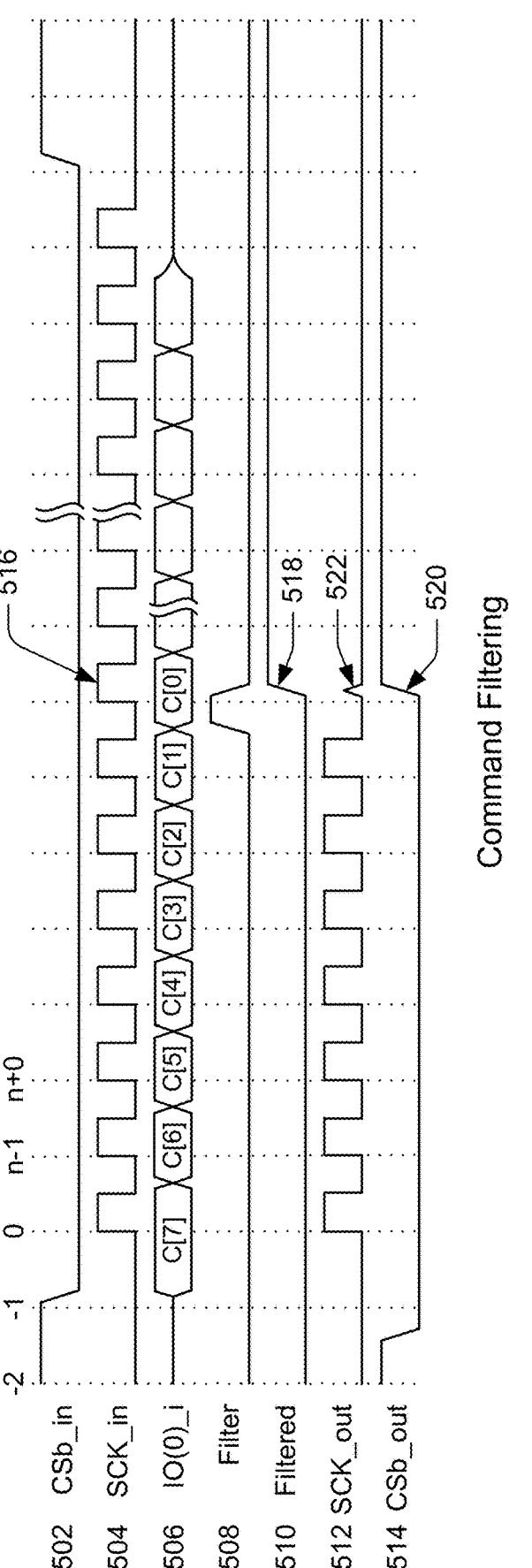
FIG. 5 illustrates an example timing diagram of SPI communication signaling in which aspects of secure SPI communication may be implemented.

FIG. 5 illustrates at 500 an example timing diagram of SPI communication signaling in which aspects of secure SPI communication may be implemented. The timing diagram 500 depicts respective timing and transitions of signals in accordance with one or more aspects of secure SPI communication. As described herein, various SPI interconnect signal may be received by a SPI command filter 116 and/or secure SPI communication module, which may then pass, gate, or propagate those signals to a downstream SPI peripheral, such as a SPI Flash device. In this example, a SPI chip select signal 502 (CSb_in 502) may travel on a SPI chip select line from the host system 306 to the secure SPI communication module 302, a SPI clock signal 504 (SCK_in 504) may travel on a SPI clock line from the host system 306, and an SPI I/O line 506 (IO[0]_i 506) may travel from the host system 306 to the secure SPI communication module 302 on a serial data line of the SPI interconnect. In aspects, a filter signal 508 (Filter 508) may represent a signal or interrupt indicative of when an unauthorized command is detected or determined by the SPI command filter 116. In response to detecting or determining the unauthorized command, the SPI command filter 116 may generate, alter, or toggle one or more other signals in accordance with aspects described herein. In this example, the SPI command filter raises a command filtered signal 510 (filtered 510), which may propagate to SPI chip select line logic and/or a clock-gating cell coupled with the SPI clock. Here, the SPI clock out signal 512 (SCK_out 512) may represent an output of the clock-gating cell to the clock input of the SPI Flash device and the chip select output signal 514 (CSb_out 514) may represent an output of chip select line logic to a chip select input of the SPI Flash device.

As an example, when a command is transmitted as the IO[0]_i 506 signal from the host system 306 to the SPI device 308, the CSb_in signal 502 is asserted by the SPI interface of the host system 306 and remains asserted for the duration of the transmission. The CSb_in signal 502 is latched asserted by the filtered signal 510 and is passed on to the SPI Flash device 308. Latching the chip select signal (e.g., CSb_in signal 502 and CSb_out signal 514) in this manner may assure a clean chip select assertion and subsequent manipulation, if needed, without glitches. Without this features and if glitches are introduced on the chip select line, the SPI Flash device may demonstrate unknown behavior, which may include a reset that damages or corrupts contents of the SPI Flash device 308. In aspects, each of the bits (e.g., eight bits) of the command or opcode are clocked to the SPI device 308 based on the SCK_out 512 signal being the SCK_in 504 signal. In this example, the command filter 116 may not determine whether the command is authorized or unauthorized until the command filter 116 receives all 8 bits of the command. When the command filter 116 determines an eighth bit, at 516 in the early part of the SCK_in 502 clock pulse corresponding to that eighth bit, of the command and that the command is an unauthorized command (e.g., compares the command to a command block list), the command filter 116 implements command filtering. In this example, the SPI command filter 116 asserts, at 518, the filtered command signal 510, which may in turn assert or deassert (depending on polarity configuration of the SPI Flash pins) the CSb_out 514 signal. The SPI command filter 116 also deasserts the clock enable of the clock-gating cell to pause or delay the SCK_out 512 signal to the SPI Flash device. By so doing, the SPI command filter 116 may prevent the eighth bit of the command or opcode from being registered or consumed by the SPI Flash device 308. Further, by gating the clock and deasserting the chip select signal, the SPI command filter 116 may avoid glitching the chip select line, which may prevent the SPI Flash device 308 from receiving or interpreting any incorrect or unauthorized commands. While this example implemented a case where a command was sent by the host system 306 to the SPI device 308, a converse application may be implemented using the same logic, that is, if the SPI device 308 sent unauthorized payloads or data to the host system 306, the implementation would prevent the host from consuming the unauthorized communications as in this example.

Example Methods

Methods 600 through 800 are illustrated as respective sets of blocks that depict acts or operations that may be performed but are not necessarily limited to the order or combinations shown for performing the operations by the respective blocks. Further, any of one or more of the operations may be repeated, combined, reorganized, or linked to provide a wide array of additional and/or alternate methods. The described techniques are not limited to performance by one entity or multiple entities operating on one system or device. In aspects, operations or acts of the methods 600 through 800 are performed by or managed by a processor, security circuitry component, memory, secure SPI communication module, SPI command filter, SPI clock control, or other entity configured to implement secure SPI communication. For clarity, the methods are described with reference to the elements of FIG. 1 and/or entities, components, or configurations described with reference to FIGS. 2-5 and FIG. 9.

FIG. 6 illustrates example method(s) 600 for secure SPI communication that may be implemented by a SPI command filter 116 or secure SPI communication module operably associated with a host or SPI interconnect in accordance with one or more aspects. In various aspects, the SPI command filter 116 or secure SPI communication module may implement the operations of the method 600 to block downstream commands from reaching one or more peripheral blocks (e.g., Flash memory device) if those commands are unauthorized or not permitted.

At 602, a SPI command filter monitors communications exchanged over a SPI interconnect between a host of a system and a peripheral block of the system. For example, the SPI command filter can snoop or monitor a data line of the serial peripheral interface interconnect or bus to obtain bits of the command or opcode of SPI communications being communicated over the SPI interconnect. In some cases, the commands are sent from a system host to a SPI Flash device.

At 604, the SPI command filter compares respective commands of the communications to information indicating which command the peripheral block is not authorized to execute. In some cases, the SPI command filter uses a received command, or portion of received command, to index into a table to determine whether the command is allowed to pass through or disallowed (e.g., filtered). For example, the enable bit control indicates or controls whether the command is allowed to pass downstream to the peripheral device or filtered. In some implementations, an enable bit value of one "1" indicates a command is allowed to pass and an enable bit value of zero "O" indicates that the command is filtered by the secure SPI communication module or command filter.

At 606, the SPI command filter determines, based on the comparison, that one of the respective commands is one of the commands that the peripheral block is not authorized to execute. In other words, the SPI command filter detects an unpermitted or unauthorized command propagating on the SPI interconnect to the peripheral block. The SPI command filter may determine that the command is unauthorized based on a partial or complete command, such as on an eighth bit of the command or corresponding opcode.

At 608, the SPI command filter prevents the peripheral block from receiving at least a portion of the respective command that the peripheral block is not authorized to execute. In aspects, the SPI command filter alters a state of a chip select line or a clock line of the SPI interconnect to the peripheral block. In some cases, the SPI command filter gates a clock to the SPI peripheral and then toggles a chip select line, which may prevent glitching of the chip select line when the SPI command filter acts to prevent consumption of the unauthorized command. This may prevent the peripheral block from receiving, consuming, or processing at least a portion of the unauthorized command of the communication. From operation 608, the method 600 may return to operation 602 to continue monitoring or snooping the SPI interconnect for unauthorized commands issued across the SPI interconnect to the peripheral block or other peripheral blocks of the system.

FIG. 7 illustrates example methods 700 for filtering commands of SPI communications in accordance with one or more aspects in accordance with one or more aspects. In various aspects, the SPI command filter 116 or secure SPI communication module may implement the operations of the method 700 to block downstream commands from reaching one or more peripheral blocks (e.g., Flash memory device) if those commands are unauthorized or not permitted.

At 702, the SPI command filter monitors respective commands of communications exchanged between a host and peripheral device over a SPI interconnect. For example, the SPI command filter can snoop or monitor a data line of the serial peripheral interface interconnect or bus to obtain bits of the command or opcode of SPI communications being communicated over the SPI interconnect. In some cases, the commands are sent from a system host to a SPI Flash device.

At 704, the SPI command filter compares the respective commands to a table of commands that the peripheral device is not authorized to execute or receive. In some cases, the SPI command filter uses a received command, or portion of received command, to index into a table to determine whether the command is allowed to pass through or disallowed (e.g., filtered). For example, the enable bit control indicates or controls whether the command is allowed to pass downstream to the peripheral device or filtered. In some implementations, an enable bit value of one "1" indicates a command is allowed to pass and an enable bit value of zero "0" indicates that the command is filtered by the secure SPI communication module or command filter.

At 706, the SPI command filter determines whether a respective command is authorized for execution by the peripheral device. From 706, in response to confirming that the respective command is authorized for execution, the method proceeds to 708 at which the SPI command filter passes the communication that includes the respective command to the peripheral device via the SPI interconnect.

Alternatively, in response to determining that the respective command is not authorized for execution, the method proceeds to 710 at which the SPI command filter may enact countermeasure operations to prevent the peripheral device from receiving or processing at least a portion of the unauthorized command. To do so, the SPI command filter gates a SPI clock line to the peripheral device at 710. This may prevent propagation of a clocking beat, transition, or signal to the peripheral chip, which may prevent the peripheral device from consuming or processing at least a portion of the command. In some cases, the SPI command filter gates the SPI clock line on or proximate the eighth beat or clock cycle by which the eighth bit command is communicated to the peripheral device, which may cause the peripheral device to discard the unauthorized command.

At 712, the SPI command filter deasserts a SPI chip select line to the peripheral device. In some cases, the SPI command filter deasserts the SPI chip select line on or proximate an eighth beat or clock cycle by which eighth bit command is communicated to the peripheral device. In aspects, deasserting (or asserting depending on logic polarity) the SPI chip select line while the SPI clock is gated or paused enables the SPI command filter to toggle the SPI chip select line without glitching the SPI chip select line or SPI peripheral. By so doing, the SPI command filter may prevent the peripheral device from consuming or processing the eighth bit of the command, which may cause or force the peripheral device to discard the unauthorized command or the received portion thereof. In some implementations, the SPI command filter may deassert the chip select line and gate the clock signal at a same time or within a short span of time, such as less than one half of a SCK period (e.g., 10 to 50 nanoseconds with a 25 MHz to 100 Mhz SCK. This may be effective to prevent the deassertion of the chip select line from glitching the peripheral device. At 714, the SPI command filters resumes the SPI clock line when the host releases an upstream chip select line, which may enable continued operation of the SPI interconnect.

FIG. 8 illustrates an example method 800 for manipulating command addresses to enable alternate binary image access in accordance with one or more aspects. In various aspects, the SPI command filter 116 or secure SPI communication module may implement the operations of the method 800 to enable A/B mode binary image or partition access of a Flash memory device.

At 802, a secure SPI communication module or ROT device of a system accesses a SPI Flash memory device via a SPI interconnect that couples a host of the system to the Flash memory device. The Flash memory device may include multiple partitions on which different binary images or other information of the host system are stored. At 804, the secure SPI communication module or the RoT device verifies a binary image stored on a first partition of the SPI Flash memory device.

Optionally at 806, in response to verifying the binary image is authentic, the secure SPI communication module or the ROT device allows the host of the system to load the binary image from the SPI Flash memory device. Optionally At 808, the secure SPI communication module manipulates one or more address bits of a command traversing the SPI interconnect to access a second partition of the SPI Flash memory device. At 810, the secure SPI communication module enables the host of the system to load another binary image from the second partition of the SPI Flash memory device.

Example System-on-Chip

Figure 9:
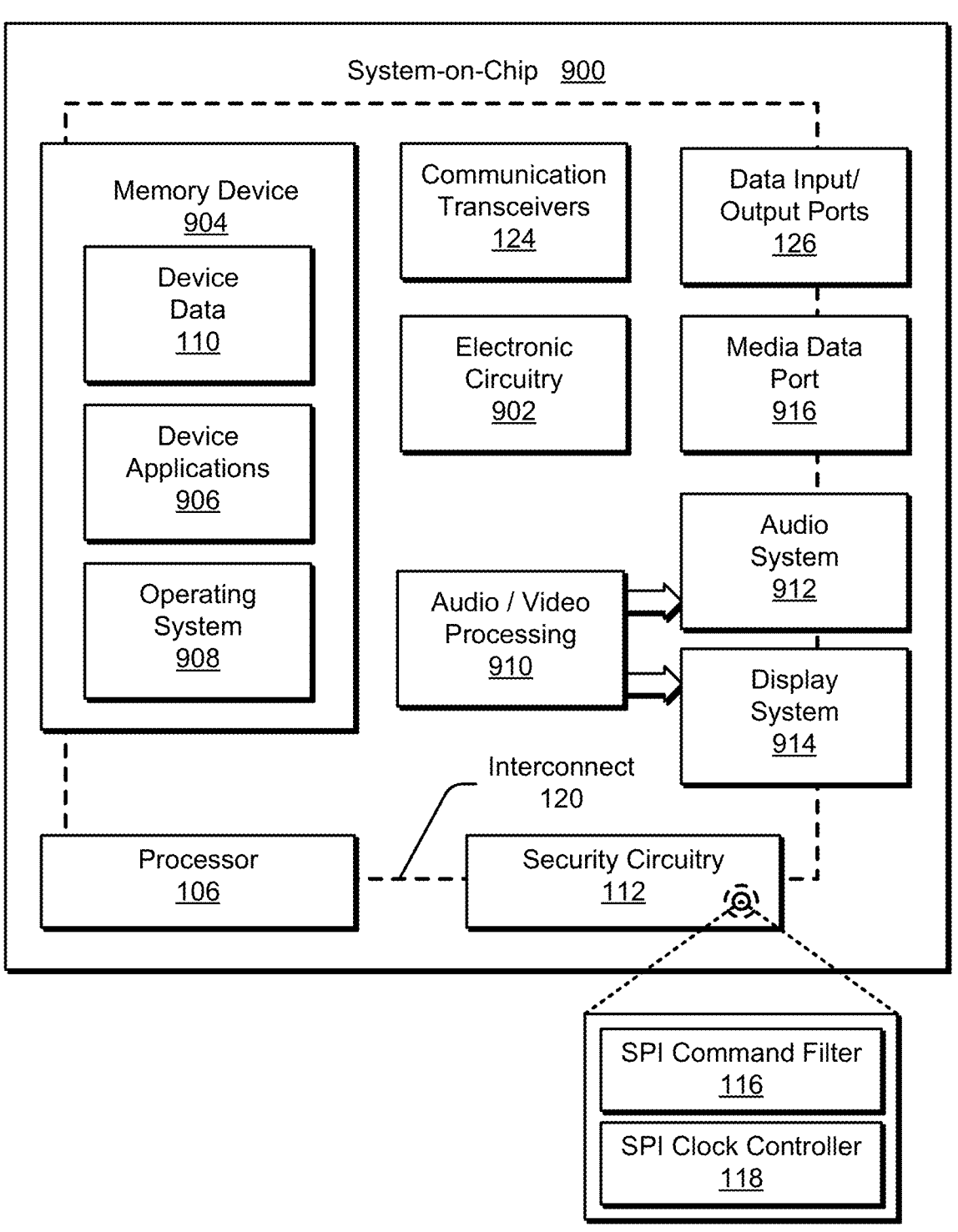
FIG. 9 illustrates an example System-on-Chip that may implement aspects of secure SPI communication.

FIG. 9 illustrates various components of an example System-on-Chip 900 (SoC 900) that can implement secure SPI communication in accordance with one or more aspects. The SoC 900 may be implemented as any single or multiple of a fixed, mobile, stand-alone, or embedded device; in any form of a consumer, computer, portable, user, server, communication, phone, navigation, gaming, audio, camera, messaging, media playback, and/or other type of SoC-enabled device, such as those apparatuses 102 depicted in or described with reference to FIG. 1. One or more of the illustrated components may be realized as discrete components, modules, IP blocks, or as integrated components on at least one integrated circuit of the SoC 900. Generally, the various components of the SoC 900 are coupled via an interconnect 120 and/or one or more fabrics that support communication between the components in accordance with one or more aspects of secure SPI communication.

The SoC 900 can include one or more communication transceivers 124 that enable wired and/or wireless communication of device data 110, such as received data, transmitted data, or other information identified above. Examples of the communication transceivers 124 include a near-field communication (NFC) transceiver, wireless personal area network (PAN) (WPAN) radio compliant with various IEEE 802.15 (Bluetooth™) standards, a wireless local area network (LAN) (WLAN) radio compliant with any of the various IEEE 802.11 (WiFi™) standards, a wireless wide area network (WAN) (WWAN) radio (e.g., those that are Third Generation Partnership Project compliant (3GPP-compliant)) for cellular connectivity, a wireless metropolitan area network (MAN) (WMAN) radio compliant with various IEEE 802.16 (WiMAX™) standards, an infrared (IR) transceiver compliant with an Infrared Data Association (IrDA) protocol, and a wired local area network LAN Ethernet transceiver.

The SoC 900 may also include one or more data input/output ports 126 (I/O ports 126) via which any type of data, media content, and/or other inputs can be communicated, such as user-selectable inputs, messages, applications, music, television content, recorded video content, and any other type of audio, video, and/or image data received from any content and/or data source, including a sensor like a microphone or a camera. The data I/O ports 126 may include USB ports, coaxial cable ports, fiber optic ports for optical fiber interconnects or cabling, and other serial or parallel connectors (including internal connectors) for operably coupling a Flash memory, optical media writer/reader (e.g., DVDs, CDs), and the like. These data I/O ports 126 may be used to couple the SoC to components, peripherals, or accessories such as keyboards, microphones, cameras, or other sensors.

The SoC 900 of this example includes at least one processor 106 (e.g., any one or more of application processors, microprocessors, digital signal processors (DSPs), controllers, and the like), which can include a combined processor and memory system (e.g., implemented as part of an SoC), that processes (e.g., executes) computer-executable instructions to control operation of the device. In aspects, the processor 106 may executes computer-readable instructions (e.g., operating system or firmware) to implement host functionalities of the SoC 900 that interacts with other components and/or peripheral blocks of the SoC. The processor 106 may be implemented as an application processor, embedded controller, microcontroller, security processor, artificial intelligence (AI) accelerator, and the like. Generally, a processor or processing system may be implemented at least partially in hardware, which can include components of an integrated circuit or on chip system, a digital signal processor (DSP), an application-specific integrated circuit (ASIC), a field programmable gate array (FPGA), a complex programmable logic device (CPLD), and other implementations in silicon and/or other materials.

Alternatively or additionally, the SoC 900 can be implemented with any one or combination of electronic circuitry, which may include software, hardware, firmware, or fixed logic circuitry that is implemented in connection with processing and control circuits, which are generally indicated at 902 (as electronic circuitry 902). This electronic circuitry 902 can implement executable or hardware-based modules (not shown in FIG. 9), such as through processing/computer-executable instructions stored on computer-readable media, through logic circuitry and/or hardware (e.g., such as an FPGA), and so forth.

In aspects, the SoC 900 includes an interconnect 120, which may include any one or more of a system bus, link, channels, interconnect, crossbar, data transfer system, or other switch fabric that couples the various components within the device to enable various aspects of secure SPI signaling and/or communication. A system bus or interconnect can include any one or a combination of different bus structures, such as a memory bus or memory controller, a SPI bus, SPI interconnect, peripheral bus, parity blocks, CRC blocks, ECC blocks, TL-UL fabric, a universal serial bus, and/or a processor or local bus that utilizes any of a variety of bus architectures.

The SoC 900 also includes one or more memory devices 904 that enable data storage, examples of which include random access memory (RAM), non-volatile memory (e.g., read-only memory (ROM), Flash memory, erasable programable read-only memory (EPROM), and electrically erasable programable read-only memory (EEPROM)), and a disk storage device. One or more of the memory devices 904 may communicate over a SPI interconnect, which is coupled to a SPI command filter 116 and/or SPI clock controller 118 that implement aspects of secure SPI communication as described herein. The memory device(s) 904 may be distributed across different logical storage levels of a system as well as at different physical components. The memory device(s) 904 provide data storage mechanisms to store the device data 110, other types of code and/or data, and various device applications 906 (e.g., software applications or programs). For example, an operating system 908 can be maintained as software instructions within the memory device 904 and executed by the processor 106.

In some implementations, the SoC 900 also includes an audio and/or video processing system 910 that processes audio data and/or passes through the audio and video data to an audio system 912 and/or to a display system 914 (e.g., a video buffer or a screen of a smartphone or camera). The audio system 912 and/or the display system 914 may include any devices that process, display, and/or otherwise render audio, video, display, and/or image data. Display data and audio signals can be communicated to an audio component and/or to a display component via an RF (radio frequency) link, S video link, HDMI (high-definition multimedia interface), composite video link, component video link, DVI (digital video interface), analog audio connection, video bus, or other similar communication link, such as a media data port 916. In some implementations, the audio system 912 and/or the display system 914 are external or separate components of the SoC 900. Alternatively, the display system 914, for example, can be an integrated component of the example SoC 900, such as part of an integrated touch interface.

The SoC 900 of FIG. 9 may be an example implementation of the apparatus 102 of FIG. 1, an example implementation of a device or system that can perform aspects of secure SPI communication as described with reference to FIG. 1 through FIG. 8. The SoC 900 can thus include security circuitry 112 (e.g., an RoT device), SPI command filter 116, and/or SPI clock controller 118 which can be a separate circuitry or IP blocks, or included as part of another IC chip or device, like the processor 106, the electronic circuitry 902, or the memory device 904. Accordingly, one or more of the illustrated components may be integrated on the same semiconductor substrate, semiconductor package, IC chip, SoC, or a single printed circuit board (PCB).

As shown, the security circuitry 112 of the SoC 900 is implemented with instances of the SPI command filter 116 and the SPI clock controller 118, which may be configured or include components as described in FIGS. 1-5 (e.g., as a secure SPI communication module). As such, the security circuitry 112, SPI command filter 116, and the SPI clock controller 118 may enable the SoC 900 to implement aspects of secure SPI communication as described herein. For example, the SPI command filter 116 can monitor communications exchanged by a host of the SoC 900 and a Flash memory module (e.g., memory device 904) of the SoC 900. In aspects, the SPI command filter 116 compares respective commands of the communications sent by the host to information indicating which commands the Flash memory module is not authorized to execute. Based on the comparing, the SPI command filter 116 determines that one of the respective commands is one of the commands that the Flash memory module is not authorized to execute (e.g., a write-status-register command). In response to the determination, the SPI command filter 116 can deassert a chip select line of the Flash memory module or use the SPI clock controller 118 to gate or suspend a SPI clock line of the Flash memory module. By so doing, the SPI command filter 116 can prevent the Flash memory module from receiving or processing at least a portion of the unauthorized command, which may prevent the unauthorized command from comprising security of the Flash memory module. Alternatively or additionally, the SPI command filter 116 or a secure SPI communication module may verify integrity of a binary image stored on a first partition of the Flash memory module. If integrity verification fails, the SPI command filter 116 may alter an address of a SPI interconnect transaction to cause another binary image to load from a second partition of the Flash memory module to prevent the host from loading the unverified, and possibly compromised, binary image from the first partition. The concepts of secure SPI communication as described herein can therefore be implemented by, or in conjunction with, the SoC 900 of FIG. 9.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although aspects of secure SPI communication have been described in language specific to certain features and/or methods, the subject of the appended claims is not necessarily limited to the specific features or methods described. Rather, the specific features and methods are disclosed as example implementations for secure SPI communication.

An example implementation of a secure SPI passthrough module may be defined and/or described in the associated Computer Program Listing Appendix (CPLA) entitled "SPI Module CPLA", the disclosure of which is incorporated herein by reference in its entirety.

Additional Examples

Examples of secure SPI communication are provided below:

Example 1: A method implemented method implemented by security circuitry associated with a host of a system for secure serial peripheral interface communication, the method comprising: monitoring communications transmitted by the host to a peripheral block of the system that is coupled to the host via a serial peripheral interface (SPI) interconnect; comparing respective commands of the communications sent by the host to information indicating which commands the peripheral block is not authorized to execute; determining, based on the comparing, that one of the respective commands is a command that the peripheral block is not authorized to execute; and preventing the peripheral block from receiving at least a portion of the respective command that the peripheral block is not authorized to execute.

Example 2.1: The method as recited by any of the examples, wherein the preventing comprises altering a state of a chip select line or a clock line of the SPI interconnect to prevent the peripheral block from receiving the at least a portion of the respective command of the communication sent by the host.

Example 2.2: The method as recited by any of the examples, wherein the preventing comprises altering a state of a chip select line or a clock line of the SPI interconnect to prevent the peripheral block from receiving the at least a portion of the respective command of the communication sent by the host.

Example 3: The method as recited by any of the examples, wherein the respective command of the communication comprises eight bits; and the altering comprises deasserting the chip select line prior to or on an eighth clock cycle by which an eighth bit of respective command is communicated via the SPI interconnect to prevent at least the eighth bit of the respective command from being processed by the peripheral block.

Example 4: The method as recited by any of the examples, wherein: the respective command of the communication comprises eight bits; and the altering comprises gating the clock line prior to or on an eighth clock cycle by which an eighth bit of respective command is communicated via the SPI interconnect to prevent at least the eighth bit of the respective command from being processed by the peripheral block.

Example 5: The method as recited by any of the examples, wherein the peripheral block of the system does not include a write protect input node or a write protect input node of the peripheral block is disabled.

Example 6: The method as recited by any of the examples, wherein the respective command is a first command of a first communication, and the method further comprises: determining that a second command of a second communication sent by the host to the peripheral block comprises a write-status-register command; and altering the write-status-register command to prevent the second communication from altering a status register of the peripheral block.

Example 7: The method as recited by any of the examples, wherein the altering of the write-status-register command comprises: setting bit positions of the write-status-register command to predefined bit values to provide an altered write-status-register command; and passing, to the peripheral block, the altered write-status-register command that comprises the predefined bit values and other bits of the write-status-register command.

Example 8: The method as recited by any of the examples, wherein the information indicating the commands that the peripheral block is not authorized to execute comprises a table of: the commands that the peripheral block is not authorized to execute; and commands that the peripheral block is authorized to execute.

Example 9: The method as recited by any of the examples, further comprising configuring, prior to the monitoring of the communications, the table of the commands that the peripheral block is not authorized to execute and the commands that the peripheral block is authorized to execute.

Example 10: The method as recited by any of the examples, wherein the comparing of the respective commands of the communications sent by the host to the information of the table comprises: indexing, based on the respective commands, into the table to determine whether the respective commands are authorized for execution by the peripheral block.

Example 11: The method as recited by any of the examples, wherein the peripheral block of the system comprises a memory module coupled to the host via the SPI interconnect, the memory module comprising one of non-volatile memory or Flash memory.

Example 12: The method as recited by any of the examples, further comprising verifying a binary image stored on the memory module of the system before attempting to load the binary image from the memory module to the host via the SPI interconnect.

Example 13: The method as recited by any of the examples, comprising: in response to successful verification of the binary image, allowing the memory module to send the binary image to the host via the SPI interface; or in response to unsuccessful verification of the binary image, preventing the memory module from sending the binary image to the host via the SPI interface.

Example 14: The method as recited by any of the examples, wherein the binary image is a first binary image stored in a first partition of the memory module, and the method further comprises: manipulating an address of a read command for the first binary image to cause the memory module to send a second binary image to the host from a second partition of the memory module.

Example 15: An integrated circuit including circuitry for secure serial peripheral interface communication, the circuitry comprising: a host with a functional core; at least one peripheral block; a serial peripheral interface (SPI) interconnect coupling the host and the at least one peripheral block; and a secure SPI communication module operably coupled with the SPI interconnect and configured to perform the operations of any one of the preceding examples.

CONCLUSION

Although aspects of the described systems and methods for implementing secure SPI communication have been described in language specific to features and/or methods, the subject of the appended claims is, as recited by any of the previous examples not necessarily limited to the specific features or methods described. Rather, the specific features and methods are disclosed as example implementations of secure SPI communication, and other equivalent features and methods are intended to be within the scope of the appended claims. Further, various aspects of secure SPI communication are described, and it is to be appreciated that each described aspect can be implemented independently or in connection with one or more other described aspects.

What is claimed is:

1. A method implemented by security circuitry associated with a host of a system for secure serial peripheral interface communication, the method comprising:
    monitoring communications transmitted by the host to a peripheral block of the system that is coupled to the host via a serial peripheral interface (SPI) interconnect;
    comparing respective commands of the communications sent by the host to information indicating which commands the peripheral block is not authorized to execute;
    determining, based on the comparing, that one of the respective commands comprises a write-status-register command that the peripheral block is not authorized to execute; and
    in response to determining that the peripheral block is not authorized to execute the write-status-register command, altering the write-status-register command to prevent the write-status-register command from altering a status register of the peripheral block.

2. The method of claim 1, wherein the respective command comprises a first command of a first communication, and the method further comprises: determining that the peripheral block is not authorized to execute a second command of a second communication sent by the host to the peripheral block; and preventing the peripheral block from receiving at least a portion of the second command that the peripheral block is not authorized to execute.

3. The method of claim 2, wherein the preventing comprises altering the state of the chip select line and the clock line of the SPI interconnect to prevent the peripheral block from receiving the at least a portion of the second command of the second communication sent by the host.

4. The method of claim 3, wherein:
    the second command of the second communication comprises eight bits; and
    the altering comprises deasserting the chip select line prior to or on an eighth clock cycle by which an eighth bit of the second command is communicated via the SPI interconnect to prevent at least the eighth bit of the second command from being processed by the peripheral block.

5. The method of claim 3, wherein:
    the second command of the second communication comprises eight bits; and
    the altering comprises gating the clock line prior to or on an eighth clock cycle by which an eighth bit of the second command is communicated via the SPI interconnect to prevent at least the eighth bit of the second command from being processed by the peripheral block.

6. The method of claim 1, wherein the altering of the write-status-register command comprises:

setting bit positions of the write-status-register command to predefined bit values to provide an altered write-status-register command; and passing, to the peripheral block, the altered write-status-register command that comprises the predefined bit values and other bits of the write-status-register command.

7. The method of claim 1, wherein the information indicating which commands that the peripheral block is not authorized to execute comprises a table of:

the commands that the peripheral block is not authorized to execute; and commands that the peripheral block is authorized to execute.

8. The method of claim 7, further comprising configuring, prior to the monitoring of the communications, the table of the commands that the peripheral block is not authorized to execute and the commands that the peripheral block is authorized to execute.

9. The method of claim 7, wherein the comparing of the respective commands of the communications sent by the host to the information of the table comprises:

indexing, based on the respective commands, into the table to determine whether the respective commands are authorized for execution by the peripheral block.

10. The method of claim 1, wherein:

the peripheral block of the system comprises a memory module coupled to the host via the SPI interconnect, the memory module comprising one of non-volatile memory or Flash memory; or the peripheral block of the system does not include a write protect input node or a write protect input node of the peripheral block is disabled.

11. The method of claim 10, further comprising verifying a binary image stored on the memory module of the system before attempting to load the binary image from the memory module to the host via the SPI interconnect.

12. The method of claim 11, further comprising:

in response to successful verification of the binary image, allowing the memory module to send the binary image to the host via the SPI interface; or in response to unsuccessful verification of the binary image, preventing the memory module from sending the binary image to the host via the SPI interface.

13. The method of claim 12, wherein the binary image is a first binary image stored in a first partition of the memory module, and the method further comprises:

manipulating an address of a read command for the first binary image to cause the memory module to send a second binary image to the host from a second partition of the memory module.

14. An integrated circuit including circuitry for secure serial peripheral interface communication, the circuitry comprising:

a host with a functional core;

at least one peripheral block;

a serial peripheral interface (SPI) interconnect coupling the host and the at least one peripheral block; and a secure SPI communication module operably coupled with the SPI interconnect and configured to:

monitor communications transmitted by the host to a peripheral block of the at least one peripheral block of the integrated circuit that is coupled to the host via the serial peripheral interface (SPI) interconnect;

compare respective commands of the communications sent by the host to information indicating which commands the peripheral block is not authorized to execute;

determine, based on the comparing, that one of the respective commands comprises a write-status-register command that the peripheral block is not authorized to execute; and in response to the determination that the peripheral block is not authorized to execute the write-status-register command, alter the write-status-register command to prevent the write-status-register command from altering a status register of the peripheral block.

15. The integrated circuit of claim 14, wherein: the respective command comprises a first command of a first communication; and the secure SPI communication module is further configured to: determine that the peripheral block is not authorized to execute a second command of a second communication sent by the host to the peripheral block; and prevent the peripheral block from receiving at least a portion of the second command that the peripheral block is not authorized to execute.

16. The integrated circuit of claim 15, wherein the secure SPI communication module is further configured to alter the state of the chip select line and the clock line of the SPI interconnect to prevent the peripheral block from receiving the at least a portion of the respective second command of the second communication sent by the host.

17. The integrated circuit of claim 16, wherein:

the second command of the second communication comprises eight bits; and the secure SPI communication module is further configured to deassert the chip select line prior to or on an eighth clock cycle by which an eighth bit of the second command is communicated via the SPI interconnect to prevent at least the eighth bit of the second command from being processed by the peripheral block.

18. The integrated circuit of claim 16, wherein:

the second command of the second communication comprises eight bits; and the secure SPI communication module is further configured to gate the clock line prior to or on an eighth clock cycle by which an eighth bit of the second command is communicated via the SPI interconnect to prevent at least the eighth bit of the second command from being processed by the peripheral block.

19. The method of claim 2, wherein the preventing comprises altering a state of a chip select line or a clock line of the SPI interconnect to prevent the peripheral block from receiving the at least a portion of the second command of the second communication sent by the host.

20. The integrated circuit of claim 15, wherein the secure SPI communication module is further configured to alter a state of a chip select line or a clock line of the SPI interconnect to prevent the peripheral block from receiving the at least a portion of the second command of the second communication sent by the host.

* * * * *